(12) United States Patent
Ko et al.

(10) Patent No.: US 8,837,625 B2
(45) Date of Patent: *Sep. 16, 2014

(54) METHOD OF TRANSMITTING CONTROL INFORMATION IN WIRELESS COMMUNICATION SYSTEM

(71) Applicant: LG Electronics Inc., Seoul (KR)

(72) Inventors: Hyun Soo Ko, Anyang-si (KR); Jaho Koo, Anyang-si (KR); Jae Hoon Chung, Anyang-si (KR); Moon Il Lee, Anyang-Si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/099,736

(22) Filed: Dec. 6, 2013

(65) Prior Publication Data
US 2014/0092850 A1 Apr. 3, 2014

Related U.S. Application Data

(63) Continuation of application No. 12/548,184, filed on Aug. 26, 2009, now Pat. No. 8,625,703.

(60) Provisional application No. 61/092,071, filed on Aug. 27, 2008.

(30) Foreign Application Priority Data

May 15, 2009 (KR) .......................... 10-2009-0042820

(51) Int. Cl.
*H04L 27/10* (2006.01)

(52) U.S. Cl.
USPC ........... 375/284; 375/133; 375/285; 375/296; 375/324; 375/346

(58) Field of Classification Search
USPC ......... 375/130, 140–141, 146–147, 259–260, 375/285, 295–296, 316, 346–350
See application file for complete search history.

(56) References Cited

U.S. PATENT DOCUMENTS

| | | | |
|---|---|---|---|
| 8,625,703 B2 * | 1/2014 | Ko et al. ........................ | 375/284 |
| 2005/0249304 A1 * | 11/2005 | Takano et al. ................. | 375/267 |

(Continued)

OTHER PUBLICATIONS

Texas Instruments et al., "Format 1 B Confirmation Flag", R1-083444, 3GPP TSG-RAN Meeting #54, Aug. 2008, pp. 3.*

(Continued)

*Primary Examiner* — Sam K Ahn
*Assistant Examiner* — James M Perez
(74) *Attorney, Agent, or Firm* — Lee, Hong, Degerman, Kang & Waimey

(57) ABSTRACT

A method of transmitting control information in a wireless communication system is provided. The method includes configuring downlink control information including a plurality of information fields according to a format of scheduling for transmission of a single codeword in a spatial multiplexing mode, wherein the plurality of information fields include a precoding matrix indicator (PMI) confirmation filed for indicating whether precoding is performed on downlink data by using a PMI reported by a user equipment and a transmitted precoding matrix indicator (TPMI) information field for indicating a codebook index, and at least one of the PMI confirmation field and the TPMI information field indicates an offset value of power for the downlink data transmission or interference information for the downlink data transmission, and transmitting the downlink control information.

6 Claims, 12 Drawing Sheets

(56) References Cited

U.S. PATENT DOCUMENTS

2006/0187877 A1* 8/2006 Lundby et al. ............... 370/328
2010/0034152 A1* 2/2010 Imamura ...................... 370/329
2011/0085507 A1* 4/2011 Jongren ........................ 370/329

OTHER PUBLICATIONS

Ericsson "Correction on downlink multi-user MIMO", R1-083419, 3GPP TSG-RAN Meeting #54, Aug. 18-22, 2008, pp. 4.*

Texas Instruments, et al., "Format 1B Confirmation flag," Change Request 36.212 CR 0035, rev. 1, current version 8.3.0, 3GPP TSG-RAN Meeting #54, R1-083444, Aug. 2008, 4 pages.

Motorola, "Signalling Considerations for MU-MIMO Transmission Mode," 3GPP TSG RAN1 #54, R1-083215, Aug. 2008, 4 pages.

Nokia, et al., "Finalizing Multi-User MIMO for LTE Rel. 8," 3GPP TSG RAN WG1 Meeting #54, R1-083093, Aug. 2008, 8 pages.

LG Electronics, "Remaining Details on MU-MIMO Transmission Mode," 3GPP TSG RAN WG1 Meeting #54, R1-082940, Aug. 2008, 3 pages.

3rd Generation Partnership Project (3GPP), "Technical Specification Group Radio Access Network; Evolved Universal Terrestrial Radio Access (E-UTRA); Multiplexing and channel coding (Release 8)," 3GPP TS 36.212 V8.3.0, May 2008, 48 pages.

Japan Patent Office Application Serial No. 2011-524898, Notice of Allowance dated Feb. 5, 2014, 17 pages.

* cited by examiner

METHOD OF TRANSMITTING CONTROL INFORMATION IN WIRELESS COMMUNICATION SYSTEM

CROSS-REFERENCE TO RELATED APPLICATIONS

This application is a continuation of U.S. application Ser. No. 12/548,184, filed Aug. 26, 2009, Now U.S. Pat. No. 8,625,703, which claims the benefit of U.S. Provisional Patent Application No. 61/092,071, filed on Aug. 27, 2008, and claims the benefit of earlier filing date and right of priority to Korean Patent Application No. 10-2009-0042820, filed on May 15, 2009, the contents of all of which are hereby incorporated by reference herein in their entireties.

RELATED ART

The present invention relates to wireless communications, and more particularly, to a method of transmitting downlink control information.

Recently, to maximize performance and communication capability of a wireless communication system, a multiple input multiple output (MIMO) system has drawn attention. Being evolved from the conventional technique in which a single transmit (Tx) antenna and a single receive (Rx) antenna are used, a MIMO technique uses multiple Tx antennas and multiple Rx antennas to improve transfer efficiency of data to be transmitted or received. The MIMO system is also referred to as a multiple antenna system. In the MIMO technique, instead of receiving one whole message through a single antenna path, data segments are received through a plurality of antennas and are then collected as one piece of data. As a result, a data transfer rate can be improved in a specific range, or a system range can be increased with respect to a specific data transfer rate.

The MIMO technique includes transmit diversity, spatial multiplexing, and beamforming. The transmit diversity is a technique in which the multiple Tx antennas transmit the same data so that transmission reliability increases.

The spatial multiplexing is a technique in which the multiple Tx antennas simultaneously transmit different data so that data can be transmitted at a high speed without increasing a system bandwidth. The beamforming is used to add a weight to multiple antennas according to a channel condition so as to increase a signal to interference plus noise ratio (SINR) of a signal. The weight can be expressed by a weight vector or a weight matrix. The weight vector is referred to as a precoding vector. The weight matrix is referred to as a precoding matrix.

The spatial multiplexing is classified into single-user spatial multiplexing and multi-user spatial multiplexing. The single-user spatial multiplexing is also referred to as single user MIMO (SU-MIMO). The multi-user spatial multiplexing is also referred to as spatial division multiple access (SDMA) or multi user MIMO (MU-MIMO). A capacity of a MIMO channel increases in proportion to the number of antennas. The MIMO channel can be decomposed into independent channels. If the number of Tx antennas is Nt and the number of Rx antennas is Nr, the number of independent channels is Ni where Ni≤min{Nt, Mr}. Each independent channel can be referred to as a spatial layer. A rank represents the number of non-zero eigenvalues of the MIMO channel and can be defined as the number of spatial streams that can be multiplexed.

Control information for data transmission is transmitted to a user equipment (UE) through a downlink control channel. Downlink control information includes various types of information required for data transmission and reception. The UE may transmit data by receiving control information through the downlink control channel. The downlink control information is configured with several formats according to data to be transmitted. In the MIMO system, the downlink control information further includes precoding information. The precoding information may be unnecessary according to a data transmission mechanism of the MIMO system. For example, when using the SU-MIMO, the UE selects a specific frequency band from a wideband and transmits a precoding matrix indicator (PMI) for the selected frequency band, and when using the MU-MIMO, the UE transmits only a PMI for the wideband. A confirmation message is transmitted for the PMI transmitted by the UE, but is unnecessary information when using the MU-MIMO.

Accordingly, there is a need for a method for preventing unnecessary information from being included in downlink control information according to a predetermined format and for effectively transmitting the downlink control information.

SUMMARY OF THE INVENTION

The present invention provides a method of effectively transmitting downlink control information.

In an aspect, a method of transmitting control information in a wireless communication system includes configuring downlink control information including a plurality of information fields according to a format of scheduling for transmission of a single codeword in a spatial multiplexing mode, wherein the plurality of information fields include a precoding matrix indicator (PMI) confirmation filed for indicating whether precoding is performed on downlink data by using a PMI reported by a user equipment and a transmitted precoding matrix indicator (TPMI) information field for indicating a codebook index, and at least one of the PMI confirmation field and the TPMI information field indicates an offset value of power for the downlink data transmission or interference information for the downlink data transmission, and transmitting the downlink control information.

In another aspect, a method of processing data in a wireless communication system includes receiving downlink control information including a plurality of information fields through a downlink control channel, and receiving downlink data by using power information or interference information indicated by the downlink control information, wherein the power information or the interference information is transmitted using a field indicating whether a PMI reported by a user equipment is used in the downlink data transmission.

DESCRIPTION OF EXEMPLARY EMBODIMENTS

Figure 1:
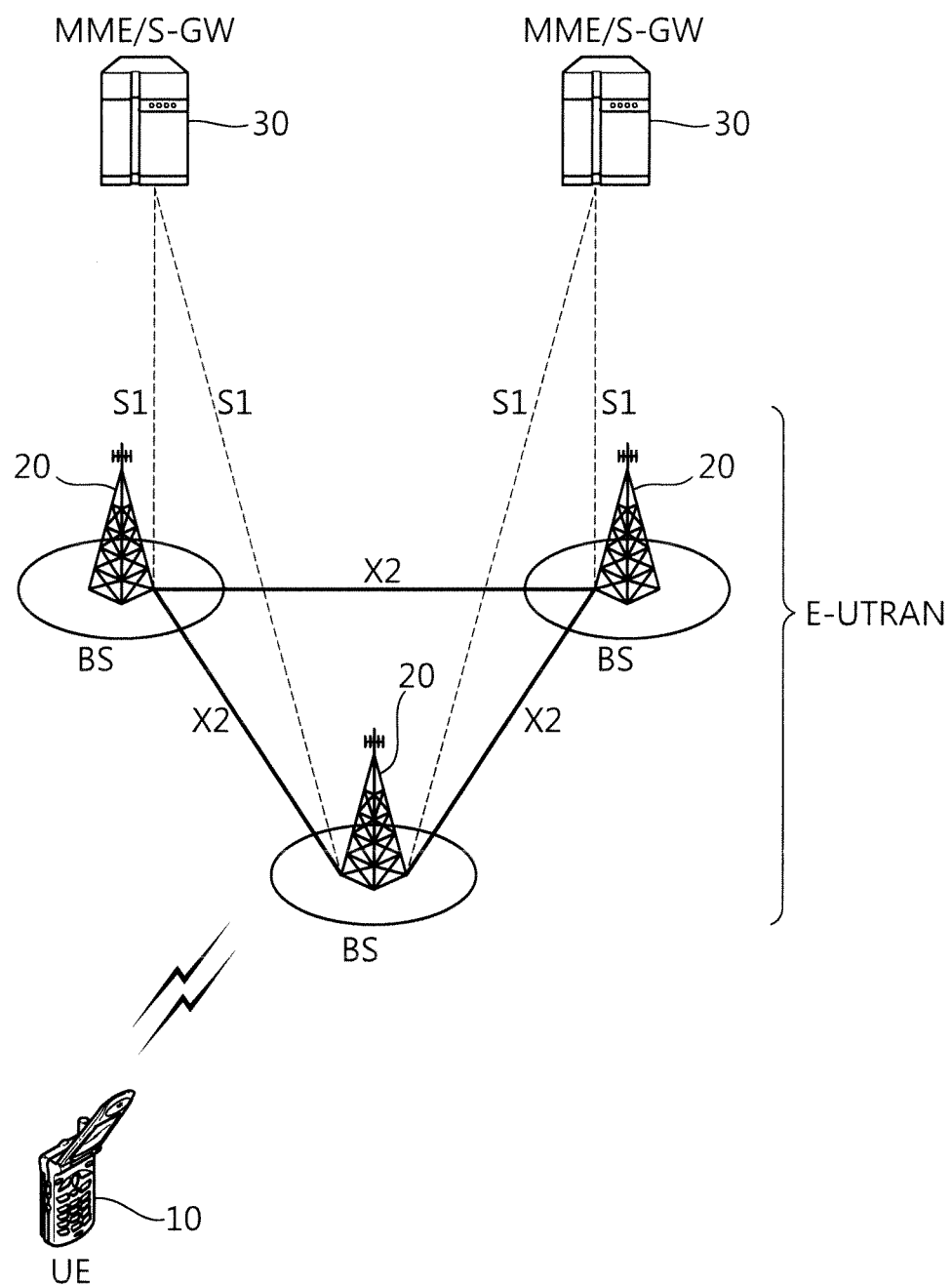
FIG. 1 shows a structure of a wireless communication system.

FIG. 1 shows a structure of a wireless communication system. The wireless communication system may have a network structure of an evolved-universal mobile telecommunications system (E-UMTS). The E-UMTS may be also referred to as a long term evolution (LTE) system. The wireless communication system can be widely deployed to provide a variety of communication services, such as voices, packet data, etc.

Referring to FIG. 1, an evolved-UMTS terrestrial radio access network (E-UTRAN) includes at least one base station (BS) 20 which provides a control plane and a user plane.

A user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. The cell is a region in which the BS 20 transmits a communication service. Interfaces for transmitting user traffic or control traffic may be used between the BSs 20. Hereinafter, a downlink is defined as a communication link from the BS 20 to the UE 10, and an uplink is defined as a communication link from the UE 10 to the BS 20.

The BSs 20 are interconnected by means of an X2 interface. The BSs 20 are also connected by means of an S1 interface to an evolved packet core (EPC), more specifically, to a mobility management entity (MME)/serving gateway (S-GW) 30. The S1 interface supports a many-to-many relation between the BS 20 and the MME/S-GW 30.

The wireless communication system may be an orthogonal frequency division multiplexing (OFDM)/orthogonal frequency division multiple access (OFDMA)-based system. The OFDM uses a plurality of orthogonal subcarriers. Further, the OFDM uses an orthogonality between inverse fast Fourier transform (IFFT) and fast Fourier transform (FFT). A transmitter transmits data by performing IFFT. A receiver restores original data by performing FFT on a received signal. The transmitter uses IFFT to combine the plurality of subcarriers, and the receiver uses FFT to split the plurality of subcarriers.

The wireless communication system may be a multiple antenna system. The multiple antenna system may be a multiple input multiple output (MIMO) system. The multiple antenna system may be a multiple-input single-output (MISO) system, a single-input single-output (SISO) system, or a single-input multiple-output (SIMO) system. The MIMO system uses a plurality of transmit (Tx) antennas and a plurality of receive (Rx) antennas. The MISO system uses a plurality of Tx antennas and one Rx antenna. The SISO system uses one Tx antenna and one Rx antenna. The SIMO system uses one Tx antenna and a plurality of Rx antennas.

The multiple antenna system can use a scheme using multiple antennas. In case of a rank 1, the scheme may be space-time coding (STC) (e.g., space frequency block code (SFBC) and space time block code (STBC)), cyclic delay diversity (CDD), frequency switched transmit diversity (FSTD), time switched transmit diversity (TSTD), etc. In case of a rank 2 or higher ranks, the scheme may be spatial multiplexing (SM), generalized cyclic delay diversity (GCDD), selective virtual antenna permutation (S-VAP), etc. The SFBC is a scheme for effectively applying selectivity in a space domain and a frequency domain to ensure both a diversity gain and a multi-user scheduling gain in a corresponding dimension. The STBC is a scheme for applying selectivity in the space domain and a time domain. The FSTD is a scheme in which signals transmitted to multiple antennas are divided in the time domain, and the TSTD is a scheme in which the signals transmitted to the multiple antennas are divided in the frequency domain. The SM is a scheme for transmitting different data to each antenna to improve a transfer rate. The GCDD is a scheme for applying selectivity in the time domain and the frequency domain. The S-VAP is a scheme using a single precoding matrix, and includes a multi-codeword (MCW) S-VAP for mixing multi-codewords to antennas in spatial diversity or spatial multiplexing and a single codeword (SCW) S-VAP using a single codeword.

Figure 2:
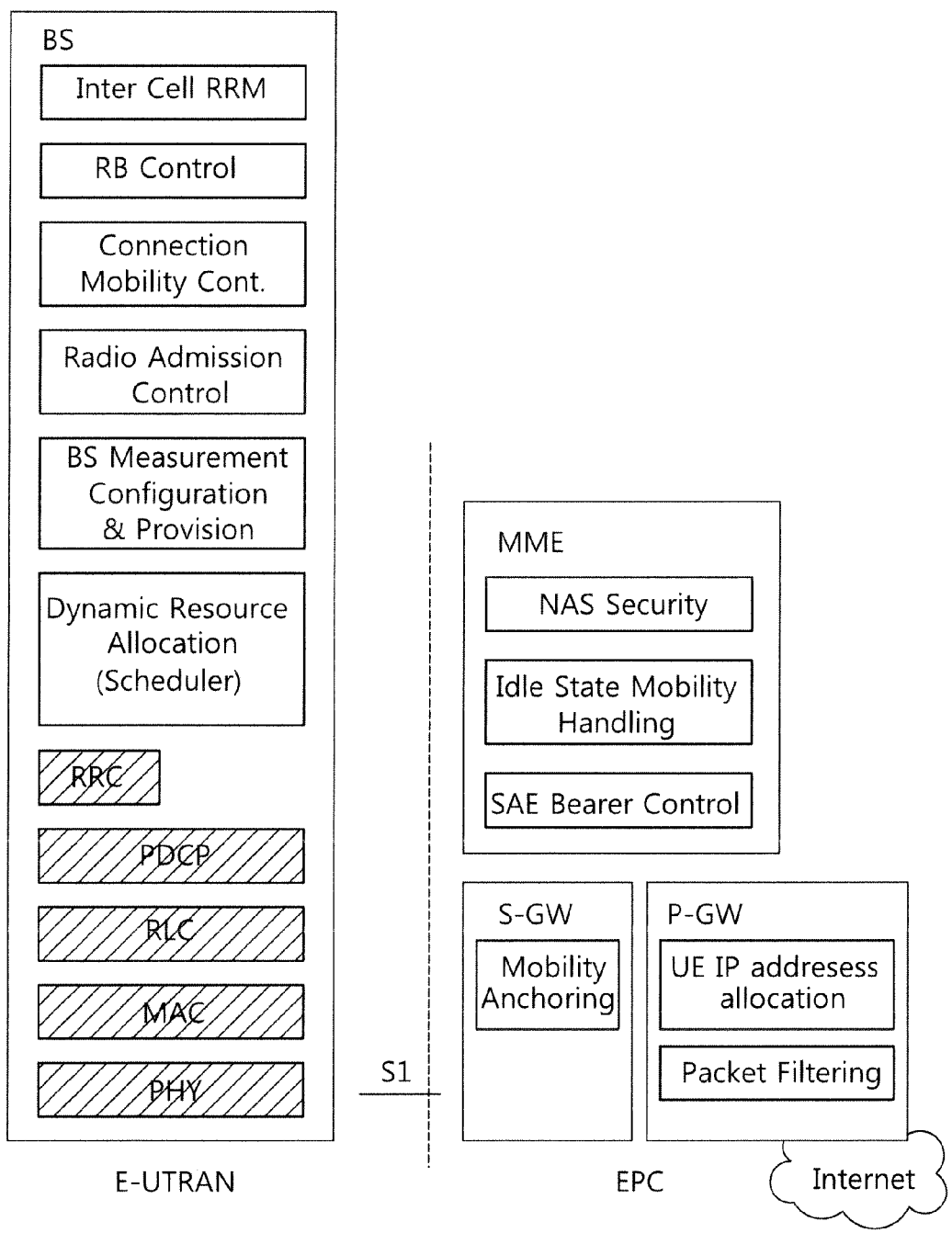
FIG. 2 is a block diagram showing functional split between an evolved universal terrestrial radio access network (E-UTRAN) and an evolved packet core (EPC).

FIG. 2 is a block diagram showing functional split between the E-UTRAN and the EPC. Slashed boxes depict radio protocol layers and white boxes depict the functional entities of the control plane.

Referring to FIG. 2, the BS performs the following functions: (1) functions for radio resource management (RRM) such as radio bearer control, radio admission control, connection mobility control, and dynamic allocation of resources to the UE; (2) Internet protocol (IP) header compression and encryption of user data streams; (3) routing of user plane data to the S-GW; (4) scheduling and transmission of paging messages; (5) scheduling and transmission of broadcast information; and (6) measurement and measurement reporting configuration for mobility and scheduling.

The MME performs the following functions: (1) non-access stratum (NAS) signaling; (2) NAS signaling security; (3) idle mode UE reachability; (4) tracking area list management; (5) roaming; and (6) authentication.

The S-GW performs the following functions: (1) mobility anchoring; and (2) lawful interception. A PDN gateway (P-GW) performs the following functions: (1) UE IP allocation; and (2) packet filtering.

Figure 3:
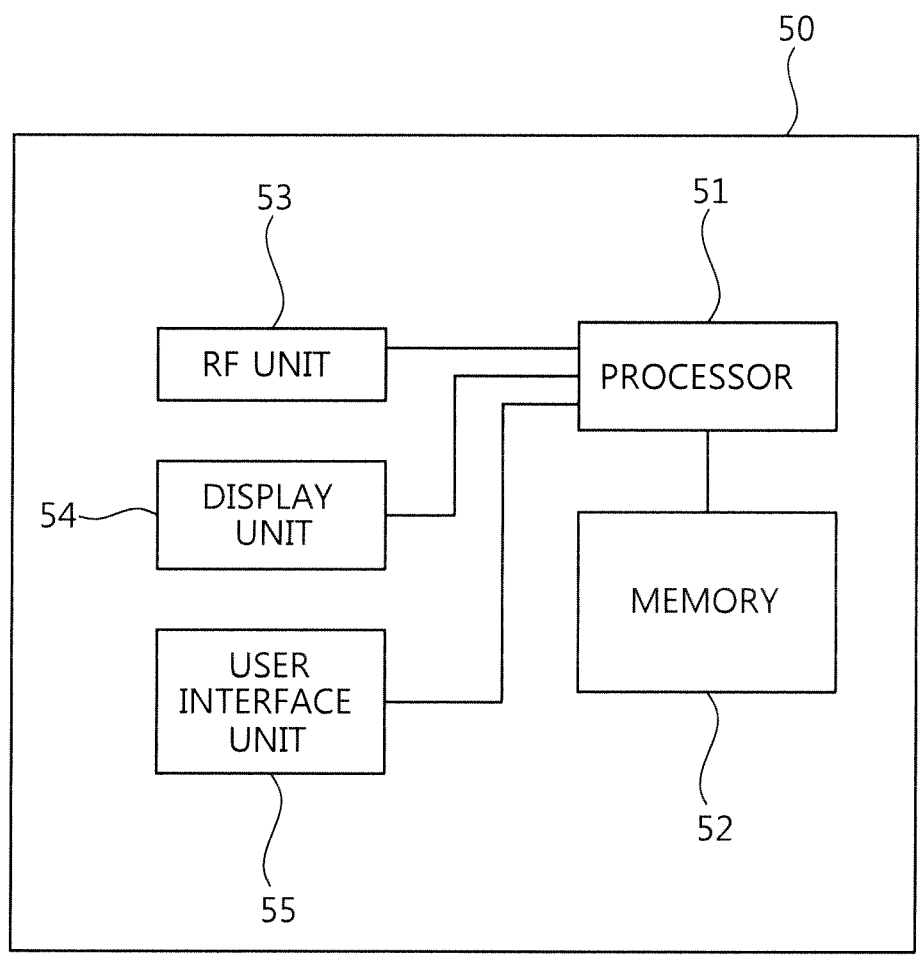
FIG. 3 is a block diagram showing constitutional elements of a user equipment.

FIG. 3 is a block diagram showing constitutional elements of the UE. A UE 50 includes a processor 51, a memory 52, a radio frequency (RF) unit 53, a display unit 54, and a user interface unit 55. Layers of the radio interface protocol are implemented in the processor 51. The processor 51 provides the control plane and the user plane. The function of each layer can be implemented in the processor 51. The memory 52 is coupled to the processor 51 and stores an operating system, applications, and general files. The display unit 54 displays a variety of information of the UE 50 and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is coupled to the processor 51 and transmits and/or receives radio signals.

Layers of a radio interface protocol between the UE and the network can be classified into a first layer (L1), a second layer (L2), and a third layer (L3) based on the lower three layers of the open system interconnection (OSI) model that is well-known in the communication system. The first layer is a physical (PHY) layer. The second layer can be divided into a medium access control (MAC) layer, a radio link control (RLC) layer, and a packet data convergence protocol (PDCP) layer. The third layer is a radio resource control (RRC) layer. The PHY layer provides an information transfer service through a physical channel. The RRC layer belongs to the third layer and serves to control radio resources between the UE and the network. The UE and the network exchange RRC messages via the RRC layer.

Figure 4:
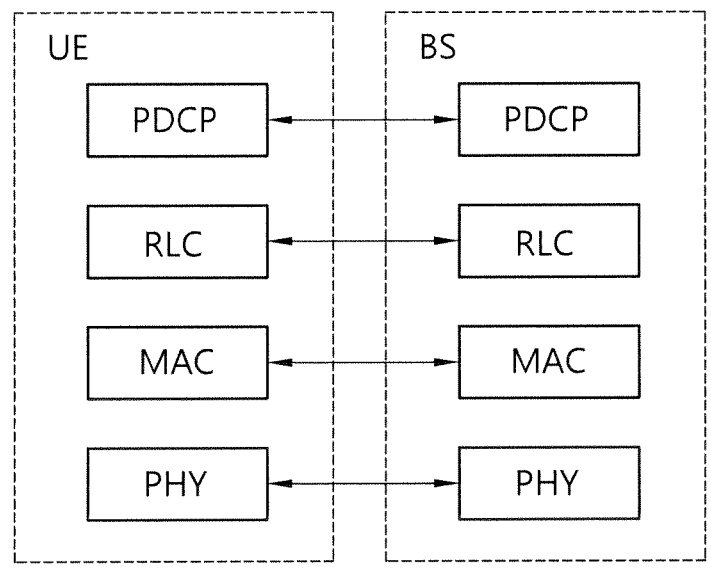
FIG. 4 is a diagram showing a radio protocol architecture for a user plane.
Figure 5:
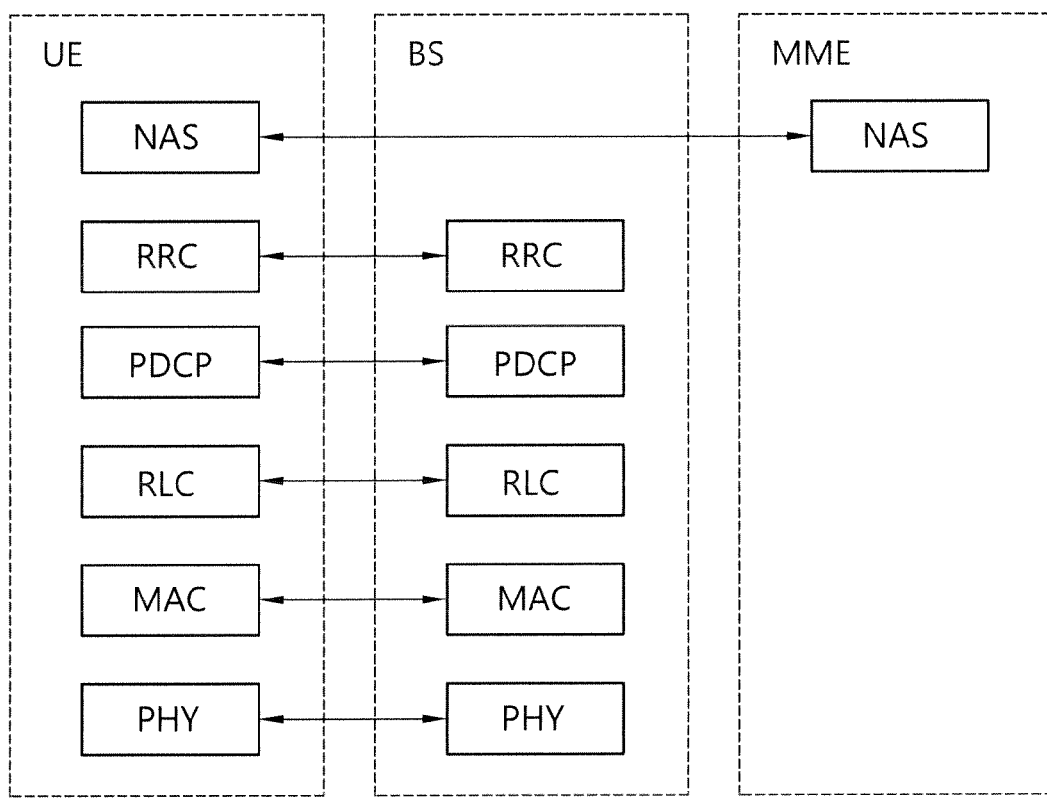
FIG. 5 is a diagram showing a radio protocol architecture for a control plane.

FIG. 4 is a diagram showing a radio protocol architecture for the user plane. FIG. 5 is a diagram showing a radio protocol architecture for the control plane. They illustrate the architecture of a radio interface protocol between the UE and the E-UTRAN. The user plane is a protocol stack for user data transmission. The control plane is a protocol stack for control signal transmission.

Referring to FIGS. 4 and 5, between different PHY layers (i.e., a PHY layer of a transmitter and a PHY layer of a receiver), data is transferred through a physical channel. The PHY layer is coupled with a MAC layer, i.e., an upper layer of the PHY layer, through a transport channel. Between the MAC layer and the PHY layer, data is transferred through the transport channel. The PHY layer provides the MAC layer and an upper layer with an information transfer service through the transport channel.

The MAC layer provides services to an RLC layer, i.e., an upper layer of the MAC layer, through a logical channel. The RLC layer supports reliable data transmission. The PDCP layer performs a header compression function to reduce a header size of an IP packet.

The RRC layer is defined only in the control plane. The RRC layer controls radio resources between the UE and the network. For this, in the RRC layer, RRC messages are exchanged between the UE and the network. The RRC layer serves to control the logical channel, the transport channel, and the physical channel in association with configuration, reconfiguration and release of radio bearers. A radio bearer is a service provided by the second layer for data transmission between the UE and the E-UTRAN. When an RRC connection is established between an RRC layer of the UE and an RRC layer of the network, it is called that the UE is in an RRC connected mode. When the RRC connection is not established yet, it is called that the UE is in an RRC idle mode.

A non-access stratum (NAS) layer belongs to an upper layer of the RRC layer and serves to perform session management, mobility management, or the like.

Figure 6:
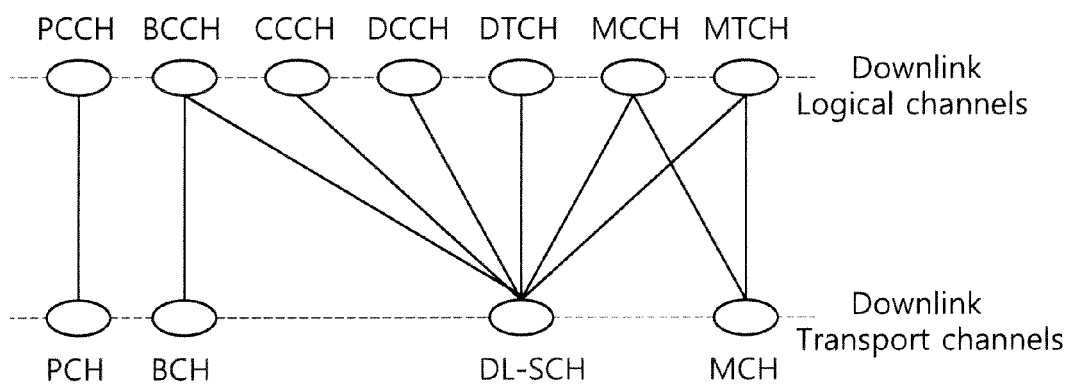
FIG. 6 shows mapping between downlink logical channels and downlink transport channels.

FIG. 6 shows mapping between downlink logical channels and downlink transport channels. The section 6.1.3.2 of 3GPP TS 36.300 V8.5.0 (May 2008) Technical Specification Group Radio Access Network; Evolved Universal Terrestrial Radio Access (E-UTRA) and Evolved Universal Terrestrial Radio Access Network (E-UTRAN); Overall description; Stage 2 (Release 8) may be incorporated herein by reference.

Referring to FIG. 6, a paging control channel (PCCH) is mapped to a paging channel (PCH). A broadcast control channel (BCCH) is mapped to a broadcast channel (BCH) or a downlink shared channel (DL-SCH). A common control channel (CCCH), a dedicated control channel (DCCH), a dedicated traffic channel (DTCH), a multicast control channel (MCCH), and a multicast traffic channel (MTCH) are mapped to the DL-SCH. The MCCH and MTCH are also mapped to a multicast channel (MCH).

A type of each logical channel is defined according to a type of information to be transmitted. A logical channel is classified into two groups, i.e., a control channel and a traffic channel.

The control channel is used for the transfer of control plane information. The BCCH is a downlink control channel for broadcasting system control information. The PCCH is a downlink channel for transmitting paging information and is used when a network does not know the location of a UE. The CCCH is a channel for transmitting control information between the UE and the network and is used when there is no RRC connection established between the UE and the network. The MCCH is a point-to-multipoint downlink channel used for transmitting multimedia broadcast multicast service (MBMS) control information. The DCCH is a point-to-point bi-directional channel for transmitting dedicated control information between the UE and the network, and is used by UEs having an RRC connection.

The traffic channel is used for the transfer of user plane information. The DTCH is a point-to-point channel used for the transfer of user information. The DTCH can exist in both uplink and downlink. The MTCH is a point-to-multipoint downlink channel for transmitting traffic data and is used by the UEs that receive the MBMS.

The transport channel is classified according to a type and characteristic of data transmission through a radio interface. The BCH is broadcast in the entire coverage area of the cell and has a fixed, pre-defined transport format. The DL-SCH is characterized by support for hybrid automatic repeat request (HARQ), support for dynamic link adaptation by varying modulation, coding, and Tx power, possibility to be broadcast in the entire cell, and possibility to use beamforming, support for both dynamic and semi-static resource allocation, support for discontinuous reception (DRX) to enable UE power saving, and support for MBMS transmission. The PCH is characterized by support for DRX to enable UE power saving and support for broadcast in the entire coverage area of the cell. The MCH is characterized by support for broadcast in the entire coverage area of the cell and support for an MBMS single frequency network (MBSFN).

Figure 7:
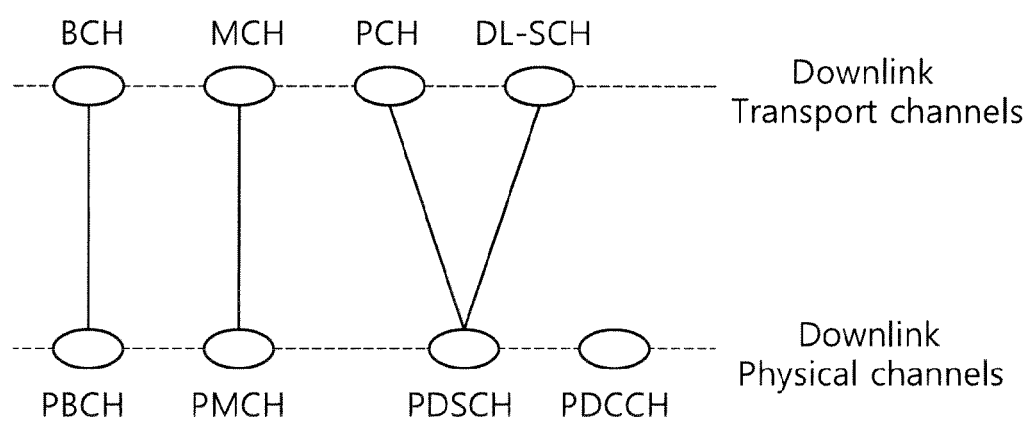
FIG. 7 shows mapping between downlink transport channels and downlink physical channels.

FIG. 7 shows mapping between downlink transport channels and downlink physical channels.

The section 5.3.1 of 3GPP TS 36.300 V8.5.0 (May 2008) may be incorporated herein by reference.

Referring to FIG. 7, a BCH is mapped to a physical broadcast channel (PBCH). An MCH is mapped to a physical multicast channel (PMCH). A PCH and a DL-SCH are mapped to a physical downlink shared channel (PDSCH). The PBCH carries a BCH transport block. The PMCH carries the MCH. The PDSCH carries the DL-SCH and the PCH.

Examples of a downlink physical control channel used in the PHY layer include a physical downlink control channel (PDCCH), a physical control format indicator channel (PCFICH), a physical hybrid ARQ indicator channel (PHICH), etc. The PDCCH informs a UE of resource assignment of the PCH and DL-SCH, and also informs the UE of HARQ information related to the DL-SCH. The PDCCH may carry an uplink scheduling grant which informs the UE of resource assignment for uplink transmission. The PCFICH informs the UE of the number of OFDM symbols used for transmission of the PDCCHs within a subframe. The PCFICH can be transmitted in every subframe. The PHICH carries HARQ acknowledgement (ACK)/negative-acknowledgement (NACK) signals in response to uplink transmission.

Figure 8:
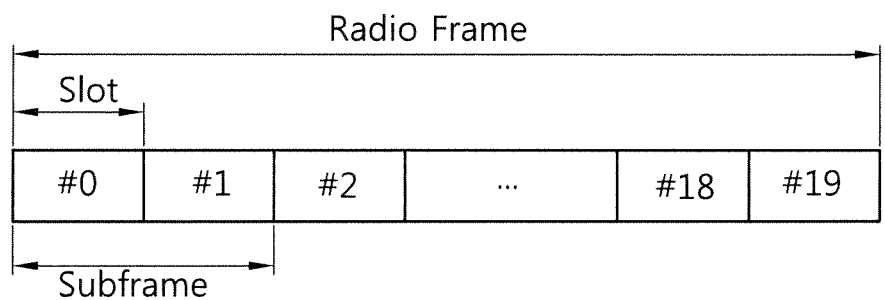
FIG. 8 shows a structure of a radio frame.

FIG. 8 shows a structure of a radio frame.

Referring to FIG. 8, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The radio frame of FIG. 8 is shown for exemplary purposes only. Thus, the number of subframes included in the radio frame or the number of slots included in the subframe or the number of OFDM symbols included in the slot may change variously.

Figure 9:
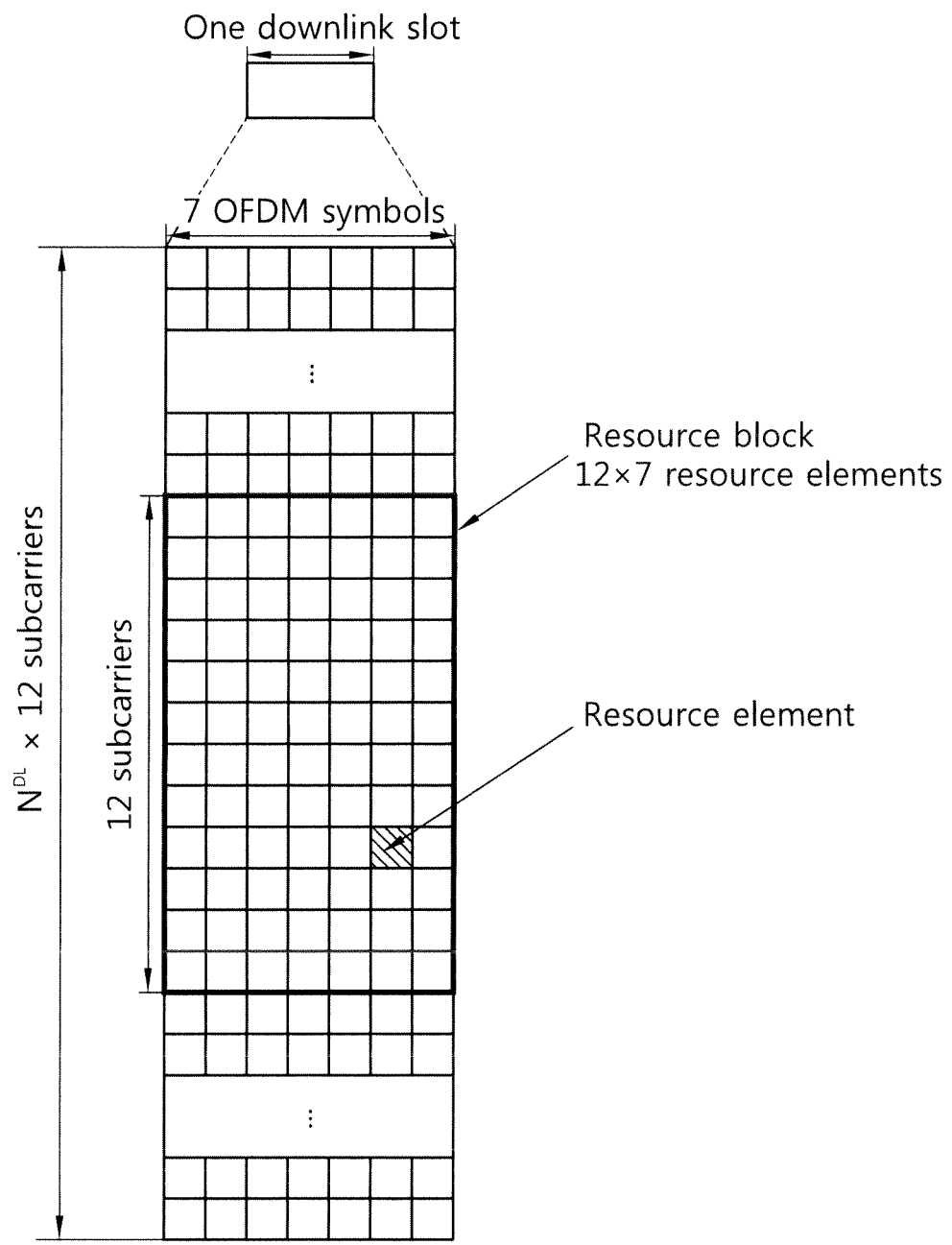
FIG. 9 shows an example of a resource grid for one downlink slot.

FIG. 9 shows an example of a resource grid for one downlink slot.

Referring to FIG. 9, the downlink slot includes a plurality of OFDM symbols in a time domain and $N^{DL}$ resource blocks (RBs) in a frequency domain. The number $N^{DL}$ of resource blocks included in the downlink slot depends on a downlink transmission bandwidth determined in a cell. For example, in an LTE system, $N^{DL}$ may be any one value in the range of 60 to 110. One RB includes a plurality of subcarriers in the frequency domain.

Each element on the resource grid is referred to as a resource element. The resource element on the resource grid can be identified by an index pair (k, l) within the slot. Herein, k (k=0, ..., $N^{DL} \times 12-1$) denotes a subcarrier index in the frequency domain, and l (l=0, ..., 6) denotes an OFDM symbol index in the time domain.

Although it is described herein that one RB includes 7×12 resource elements consisting of 7 OFDM symbols in the time domain and 12 subcarriers in the frequency domain for example, the number of OFDM symbols and the number of subcarriers in the RB are not limited thereto. Thus, the number of OFDM symbols and the number of subcarriers may change variously depending on a cyclic prefix (CP) length, a frequency spacing, etc. For example, when using a normal CP, the number of OFDM symbols is 7, and when using an extended CP, the number of OFDM symbols is 6. In one OFDM symbol, the number of subcarriers may be selected from 128, 256, 512, 1024, 1536, and 2048.

Figure 10:
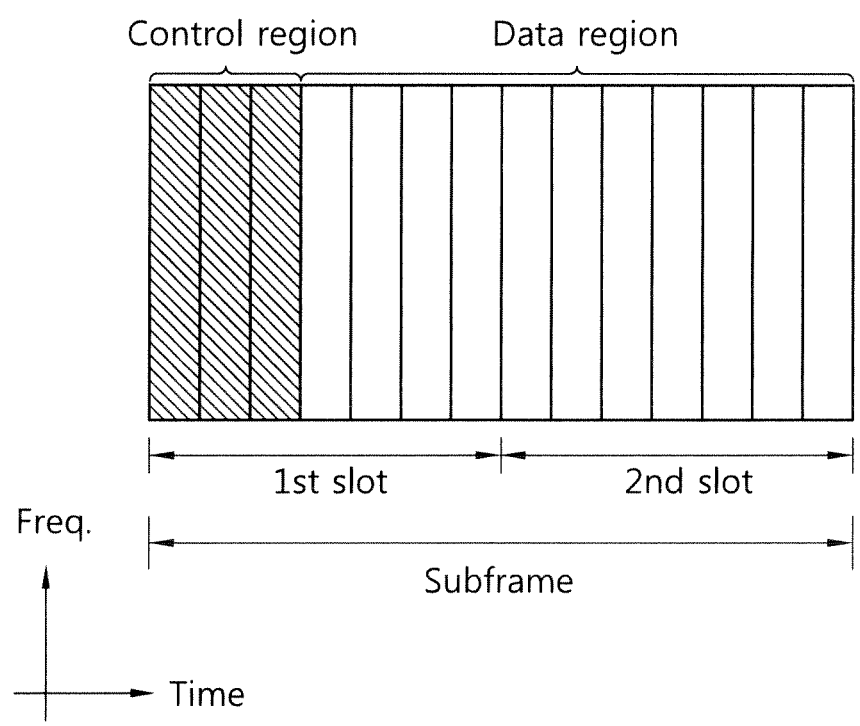
FIG. 10 shows a structure of a subframe.

FIG. 10 shows a structure of a subframe.

Referring to FIG. 10, the subframe includes two consecutive slots. A maximum of three OFDM symbols located in a front portion of a 1st slot within the subframe correspond to a control region to be assigned with a PDCCH. The remaining OFDM symbols correspond to a data region to be assigned with a PDSCH. In addition to the PDCCH, control channels such as a PCFICH, a PHICH, etc., can be assigned to the control region. The UE can read data information transmitted through the PDSCH by decoding control information transmitted through the PDCCH. Although the control region includes three OFDM symbols herein, this is for exemplary purposes only. Thus, two OFDM symbols or one OFDM symbol may be included in the control region. The number of OFDM symbols included in the control region of the subframe can be known by using the PCFICH.

The control region consists of a plurality of control channel elements (CCEs) that is a logical CCE stream. Hereinafter, the CCE stream denotes a set of all CCEs constituting the control region in one subframe. The CCE corresponds to a plurality of resource element groups. For example, the CCE may correspond to 9 resource element groups. The resource element group is used to define mapping of a control channel onto a resource element. For example, one resource element group may consist of four resource elements.

A plurality of PDCCHs may be transmitted in the control region. The PDCCH carries control information such as scheduling allocation. The PDCCH is transmitted on an aggregation of one or several consecutive CCEs. A PDCCH format and the number of available PDCCH bits are determined according to the number of CCEs constituting the CCE aggregation. Hereinafter, the number of CCEs used for PDCCH transmission is referred to as a CCE aggregation level. The CCE aggregation level is a CCE unit for searching for the PDCCH. A size of the CCE aggregation level is defined by the number of contiguous CCEs. For example, the CCE aggregation level may be an element of {1, 2, 4, 8}.

Table 1 shows an example of the PDCCH format and the number of available PDCCH bits with respect to the CCE aggregation level.

Control information transmitted through the PDCCH is referred to as downlink control information (hereinafter, DCI). The DCI includes uplink scheduling information, downlink scheduling information, system information, an uplink power control command, control information for paging, control information for indicating a random access channel (RACH) response, etc.

TABLE 1

| PDCCH format | CCE aggregation level | Number of resource element group | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

Examples of the DCI format include a format 0 for scheduling of a physical uplink shared channel (PUSCH), a format 1 for scheduling of one physical downlink shared channel (PDSCH) codeword, a format 1A for compact scheduling of the one PDSCH codeword, a format 1B for simple scheduling for rank-1 transmission of a single codeword in a spatial multiplexing mode, a format 1C for significantly compact scheduling of a downlink shared channel (DL-SCH), a format 1D for scheduling of the PDSCH in a multi-user spatial multiplexing mode, a format 2 for scheduling of the PDSCH in a closed-loop spatial multiplexing mode, a format 2A for scheduling of the PDSCH in an open-loop spatial multiplexing mode, a format 3 for transmission of a transmission power control (TPC) command for 2-bit power control for the PUCCH and the PUSCH, and a format 3A for transmission of a TPC command for 1-bit power control for the PUCCH and the PUSCH.

Figure 11:
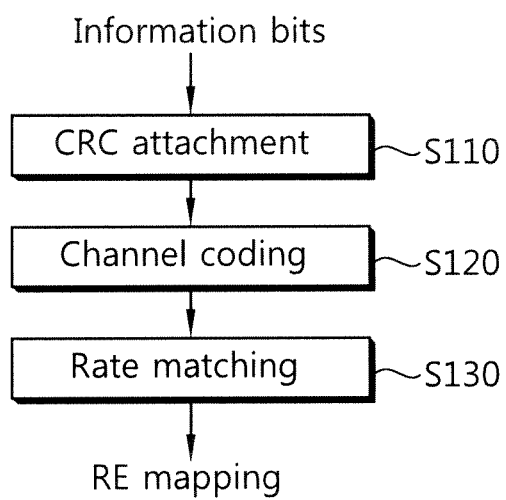
FIG. 11 is a flowchart showing a method of configuring a physical downlink control channel (PDCCH).

FIG. 11 is a flowchart showing a method of configuring a PDCCH.

Referring to FIG. 11, information bits of control information are arranged to constitute a plurality of information fields. The plurality of information fields are multiplexed according to an order of a DCI format list. A BS may select one DCI format from a plurality of DCI formats according to the control information to be transmitted.

A cyclic redundancy check (CRC) for error detection is attached to the control information conforming to the DCI format (step S110). An identifier (i.e., a radio network temporary identifier (RNTI)) is masked to the CRC according to a usage or owner of the PDCCH. Examples of the RNTI include a cell (C)-RNTI that is a unique identifier, a temporary C-RNTI that is a temporary identifier of a UE and is used in a random access process, a paging (P)-RNTI that is an identifier for a paging message transmitted through a PCH, a system information (SI)-RNTI for system information transmitted through a DL-SCH, a random access (RA)-RNTI for a random access response to a random access preamble of the UE, etc.

Channel coding is performed on the CRC-attached control information to generate coded data (step S120). A rate matching is performed on the coded data according to a CCE aggregation level assigned to the PDCCH format (step S130). The coded data is modulated to generate modulation symbols. The CCE aggregation level of modulation symbols constituting one PDCCH may be one of 1, 2, 4, and 8. The modulation symbols are mapped to physical resource elements.

Figure 12:
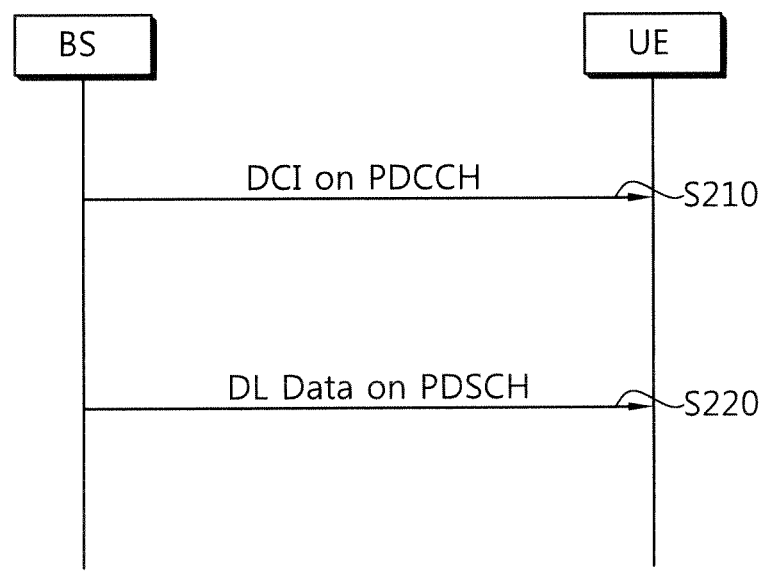
FIG. 12 shows a method of transmitting control information according to an embodiment of the present invention.

FIG. 12 shows a method of transmitting control information according to an embodiment of the present invention.

Referring to FIG. 12, a BS transmits downlink control information (DCI) through a PDCCH (step S210). The BS selects a DCI format and transmits the DCI according to the selected DCI format. It is assumed herein that the DCI format 1B is used for simple scheduling for rank-1 transmission of a single codeword in a spatial multiplexing mode.

Table 2 shows an example of the DCI transmitted using the DCI format 1B.

The DCI format 1B includes a plurality of information fields. The plurality of information fields include a localized/distributed virtual resource block (VRB) assignment flag field, a resource block assignment field, a modulation and coding scheme (MCS) field, an HARQ process number field, a new data indicator field, a redundancy version field, a TPC command field for PUCCH, a downlink assignment index field, a transmitted precoding matrix indicator (TPMI) information field for precoding, a PMI confirmation field for precoding, etc. The number of bits of each information field is for exemplary purposes only, and thus the size of information field is not limited thereto.

TABLE 2

| Information field | bit(s) |
| --- | --- |
| Localized/Distributed VRB assignment flag | 1 |
| Resource block assignment | $\lceil \log_2(N_{RB}^{DL}(N_{RB}^{DL}+1)/2) \rceil$ |
| Modulation and coding scheme | 5 |
| HARQ process number | 3(FDD), 4(TDD) |
| New data indicator | 1 |
| Redundancy version | 2 |
| TPC command for PUCCH | 2 |
| Downlink Assignment Index | 2 |
| TPMI information for precoding | 2 or 4 |
| PMI confirmation for precoding | 1 |

The localized/distributed VRB assignment flag field is an information field for identifying localized VRB assignment in which resource blocks are consecutively assigned or distributed VRB assignment in which resource blocks are distributively assigned.

The resource block assignment field may have a different bit size according to the localized VRB or the distributed VRB. For the localized VRB, $\lceil \log_2(N_{RB}^{DL}(N_{RB}^{DL}+1)/2) \rceil$ bits are provided to the resource assignment. Herein, $N_{RB}^{DL}$ denotes the number of resource blocks included in a downlink slot, and depends on a downlink transmit bandwidth determined in a cell. For the distributed VRB, $\lceil \log_2(N_{RB}^{DL}(N_{RB}^{DL}+1)/2) \rceil$ bits are provided to the resource assignment if $N_{RB}^{DL}$ is less than 50, and $\lceil \log_2(N_{RB}^{DL}(N_{RB}^{DL}+1)/2) \rceil -1$ bits are provided to the resource assignment if $N_{RB}^{DL}$ is greater than or equal to 50.

The TPMI information field indicates a codebook index corresponding to a single layer, i.e., a rank-1 transmission. Table 3 shows an example of the number of bits of the TPMI information field with respect to the number of antenna ports.

TABLE 3

| Number of antenna ports at eNode-B | Number of bits for TPMI information |
| --- | --- |
| 2 | 2 |
| 4 | 4 |

When the number of antenna ports is 2, the TPMI information field uses 2 bits. When the number of antenna ports is 4, the TPMI information field uses 4 bits. The number of antenna ports is shown for exemplary purposes only. Thus, the number of antenna ports may vary such as 6, 8, and so one, and the number of bits of the TPMI information field may also vary according to the number of antenna ports.

Table 4 shows an example of a codebook index indicated by the TPMI information field for four antenna ports.

TABLE 4

| Bit field mapped to index | Message |
| --- | --- |
| 0 | PMI = 0 |
| 1 | PMI = 1 |
| 2 | PMI = 2 |
| 3 | PMI = 3 |

Table 5 shows an example of a codebook index indicated by the TPMI information field for sixteen antenna ports.

TABLE 5

| Bitfield mapped to index | Message |
| --- | --- |
| 0 | PMI = 0 |
| 1 | PMI = 1 |
| ... | ... |
| 15 | PMI = 15 |

The PMI confirmation field indicates whether precoding for downlink data transmission will be performed using a PMI indicated by the TPMI information field or whether precoding for downlink data transmission will be performed using a last PMI reported through a PUSCH. That is, the TPMI information field indicates whether precoding for downlink data transmission will be performed using a PMI reported by a UE. Table 6 shows an example of content indicated by the PMI confirmation field.

TABLE 6

| Bit field mapped to index | Message |
| --- | --- |
| 0 | Precoding according to the indicated TPMI in the TPMI information field |
| 1 | Precoding according to the latest PMI report on PUSCH using the precoder(s) indicated by the reported PMI(s) |

A PMI confirmation message is a message indicating that precoding is performed using the last PMI reported through the PUSCH indicated by a bit value '1' of the PMI confirmation field. The PMI confirmation message implies that precoding is performed according to the PMI reported by the UE.

The PMI reported by the UE varies according to single user (SU)-MIMO using spatial multiplexing for a single user or multi user (MU)-MIMO using spatial multiplexing for multiple users. In the SU-MIMO, the UE may select a specific frequency band from a wideband and transmit a PMI for the selected frequency band. The PMI for the selected frequency band is referred to as a frequency selective PMI. In the MU-MIMO, the UE transmits only a PMI for the wideband. The PMI for the wideband is referred to as a frequency flat PMI. The frequency flat PMI may be aperiodically transmitted through the PUSCH or may be periodically transmitted through the PUCCH. The MU-MIMO is used under the condition of a high correlated antenna configuration. Thus, the PMI confirmation field is unnecessary information when using the MU-MIMO.

Hereinafter, a method of effectively configuring the information field of the DCI by using the PMI confirmation filed when using the MU-MIMO will be described.

(1) 1$^{st}$ Embodiment

The PMI confirmation field included in the DCI conforming to the DCI format 1B can be used as a downlink power offset field. Therefore, the DCI using the DCI format 1B can be configured as shown in Table 7.

TABLE 7

| Information field | bit(s) |
| --- | --- |
| Localized/Distributed VRB assignment flag | 1 |
| Resource block assignment | $\lceil \log_2(N_{RB}^{DL}(N_{RB}^{DL}+1)/2) \rceil$ |
| Modulation and coding scheme | 5 |
| HARQ process number | 3(FDD), 4(TDD) |
| New data indicator | 1 |
| Redundancy version | 2 |
| TPC command for PUCCH | 2 |
| Downlink Assignment Index | 2 |
| TPMI information for precoding | 2 or 4 |
| PMI confirmation for precoding | 0 |
| Downlink power offset | 1 |

The downlink power offset field indicates an offset value of power for rank-1 transmission using a PDSCH in MU-MIMO transmission. A UE may receive DCI for each MU-MIMO transmission and thus differently analyze the DCI.

Table 8 shows an example of the number of bits of the TPMI information field and the number of bits of the downlink power offset with respect to the number of antenna ports.

TABLE 8

| Number of antenna ports at eNode-B | Number of bits for TPMI information | Number of bits for downlink power offset |
| --- | --- | --- |
| 2 | 2 | 1 |
| 4 | 4 | 1 |

The number of bits of the downlink power offset can be used to indicate a power offset value by using one bit both for 2 antenna ports and 4 antenna ports. Power information is transmitted through upper-layer signaling. Values of 0 dB and −3 dB against a power value used by a single user can be used as the power offset value. Table 9 shows an example of a power offset value with respect to a bit value of a 1-bit downlink power offset field.

TABLE 9

| Downlink power offset field | Power offset (dB) |
| --- | --- |
| 0 | −10$\log_{10}$2 |
| 1 | 0 |

(2) 2$^{nd}$ Embodiment

In 4Tx transmission, that is, in transmission using 4 antenna ports, a 3-bit codebook consisting of a subset of a 4-bit codebook can be defined, and thus the TPMI information field can be used in 3 bits. That is, the TPMI information field can indicate a codebook of a subset consisting of a part of a codebook used in downlink data transmission. The remaining one bit of the TPMI information field and the PMI confirmation field may be used as the downlink power offset field. Therefore, the DCI using the DCI format 1B in the MU-MIMO can be configured as shown in Table 10.

TABLE 10

| Information field | bit(s) |
| --- | --- |
| Localized/Distributed VRB assignment flag | 1 |
| Resource block assignment | $\lceil \log_2(N_{RB}^{DL}(N_{RB}^{DL}+1)/2) \rceil$ |
| Modulation and coding scheme | 5 |
| HARQ process number | 3(FDD), 4(TDD) |
| New data indicator | 1 |
| Redundancy version | 2 |
| TPC command for PUCCH | 2 |
| Downlink Assignment Index | 2 |
| TPMI information for precoding | 2 or 3 |
| PMI confirmation for precoding | 0 |
| Downlink power offset | 2 |

Table 11 shows another example of the number of bits of the TPMI information field and the number of bits of the downlink power offset with respect to the number of antenna ports.

TABLE 11

| Number of antenna ports at eNode-B | Number of bits for TPMI information | Number of bits for downlink power offset |
| --- | --- | --- |
| 2 | 2 | 1 |
| 4 | 3 | 2 |

Power information is transmitted through upper-layer signaling. Values of 0 dB, −3 dB, −10 $\log_{10}$(⅓), and −6 dB against a power value used by a single user can be used as the power offset value. Table 12 shows an example of a power offset value with respect to a bit value of a 2-bit downlink power offset field.

TABLE 12

| Downlink power offset field | Power offset (dB) |
| --- | --- |
| 00 | 0 |
| 01 | −3 |
| 10 | −10$\log_{10}$(1/3) |
| 11 | −6 |

The power offset with respect to the number of bits of the downlink power offset field shown in Table 9 and Table 12 is shown for exemplary purposes only. Thus, various power offset values can be defined depending on a system.

(3) 3$^{rd}$ Embodiment

In 4Tx transmission, the localized/distributed VRB assignment flag field and the PMI confirmation field can be used as the downlink power offset field. Therefore, the DCI using the DCI format 1B in the MU-MIMO can be configured as shown in Table 13.

TABLE 13

| Information field | bit(s) |
| --- | --- |
| Localized/Distributed VRB assignment flag | 0 |
| Resource block assignment | $\lceil \log_2(N_{RB}^{DL}(N_{RB}^{DL}+1)/2) \rceil$ |
| Modulation and coding scheme | 5 |

TABLE 13-continued

| Information field | bit(s) |
| --- | --- |
| HARQ process number | 3(FDD), 4(TDD) |
| New data indicator | 1 |
| Redundancy version | 2 |
| TPC command for PUCCH | 2 |
| Downlink Assignment Index | 2 |
| TPMI information for precoding | 2 or 4 |
| PMI confirmation for precoding | 0 |
| Downlink power offset | 2 |

Table 14 shows another example of the number of bits of the TPMI information field and the number of bits of the downlink power offset with respect to the number of antenna ports.

TABLE 14

| Number of antenna ports at eNode-B | Number of bits for TPMI information | Number of bits for downlink power offset |
| --- | --- | --- |
| 2 | 2 | 2 |
| 4 | 4 | 2 |

The power offset value with respect to the number of bits of the 2-bit downlink power offset field can be expressed by Table 12. The localized/distributed VRB assignment flag field and the PMI confirmation field can also be used in 2Tx transmission as the 2-bit downlink power offset field.

(4) 4$^{th}$ Embodiment

In 4Tx transmission, a 3-bit codebook consisting of a subset of a 4-bit codebook can be defined, and thus the TPMI information field can be used in 3 bits. The remaining one bit of the TPMI information field and the PMI confirmation field can be used as the 1-bit interference vector field and the 1-bit downlink power offset field. The interference vector field indicates interference information of downlink transmission or uplink transmission. For example, a signal to interference ratio (SINR) value or a difference value thereof may be indicated according to a bit value of the interference vector field. Therefore, the DCI using the DCI format 1B in the MU-MIMO can be configured as shown in Table 15.

Table 16 shows another example of the number of bits of the TPMI information field, the number of bits of the downlink power offset, and the number of bits of the interference vector field with respect to the number of antenna ports.

TABLE 15

| Information field | bit(s) |
| --- | --- |
| Localized/Distributed VRB assignment flag | 1 |
| Resource block assignment | $\lceil \log_2(N_{RB}^{DL}(N_{RB}^{DL}+1)/2) \rceil$ |
| Modulation and coding scheme | 5 |
| HARQ process number | 3(FDD), 4(TDD) |
| New data indicator | 1 |
| Redundancy version | 2 |
| TPC command for PUCCH | 2 |
| Downlink Assignment Index | 2 |
| TPMI information for precoding | 2 or 3 |
| PMI confirmation for precoding | 0 |
| Downlink power offset | 1 |
| Interference vector | 1 |

TABLE 16

| Number of antenna ports at eNode-B | Number of bits for TPMI information | Number of bits for downlink power offset | Interference vector |
| --- | --- | --- | --- |
| 2 | 2 | 1 | 0 |
|  |  | 0 | 1 |
| 4 | 3 | 1 | 1 |

In 2Tx transmission, the PMI confirmation field can be used as the downlink power offset field or the interference vector field. An order of using fields from the TPMI information field and the PMI confirmation field to the downlink power offset field and the interference vector field may be a forward or backward order.

(5) 5$^{th}$ Embodiment

In 4Tx transmission, a 3-bit codebook consisting of a subset of a 4-bit codebook can be defined, and thus the TPMI information field can be used in 3 bits. The remaining one bit of the TPMI information field and the PMI confirmation field can be used as a 2-bit interference vector field. Therefore, the DCI using the DCI format 1B in the MU-MIMO can be configured as shown in Table 17.

TABLE 17

| Information field | bit(s) |
| --- | --- |
| Localized/Distributed VRB assignment flag | 1 |
| Resource block assignment | $\lceil \log_2(N_{RB}^{DL}(N_{RB}^{DL}+1)/2) \rceil$ |
| Modulation and coding scheme | 5 |
| HARQ process number | 3(FDD), 4(TDD) |
| New data indicator | 1 |
| Redundancy version | 2 |
| TPC command for PUCCH | 2 |
| Downlink Assignment Index | 2 |
| TPMI information for precoding | 2 or 3 |
| PMI confirmation for precoding | 0 |
| Interference vector | 2 |

Table 18 shows another example of the number of bits of the TPMI information field and the number of bits of the interference vector field with respect to the number of antenna ports.

TABLE 18

| Number of antenna ports at eNode-B | Number of bits for TPMI information | Interference vector |
| --- | --- | --- |
| 2 | 2 | 1 |
| 4 | 3 | 2 |

In 2Tx transmission, the PMI confirmation field can be used as a 1-bit interference vector field.

(6) 6$^{th}$ Embodiment

In 4Tx transmission, the localized/distributed VRB assignment flag field and the PMI confirmation field can be used as the 1-bit interference vector field and the 1-bit downlink power offset field. Therefore, the DCI using the DCI format 1B in the MU-MIMO can be configured as shown in Table 19.

TABLE 19

| Information field | bit(s) |
| --- | --- |
| Localized/Distributed VRB assignment flag | 0 |
| Resource block assignment | $\lceil \log_2(N_{RB}^{DL}(N_{RB}^{DL} + 1)/2) \rceil$ |
| Modulation and coding scheme | 5 |
| HARQ process number | 3(FDD), 4(TDD) |
| New data indicator | 1 |
| Redundancy version | 2 |
| TPC command for PUCCH | 2 |
| Downlink Assignment Index | 2 |
| TPMI information for precoding | 2 or 4 |
| PMI confirmation for precoding | 0 |
| Downlink power offset | 1 |
| Interference vector | 1 |

Table 20 shows another example of the number of bits of the TPMI information field, the number of bits of the downlink power offset, and the number of bits of the interference vector field with respect to the number of antenna ports.

In 2Tx transmission, the localized/distributed VRB assignment flag field and the PMI confirmation field can also be used as the downlink power offset field and the interference vector field. An order of using fields from the localized/distributed VRB assignment flag field and the PMI confirmation field to the downlink power offset field and the interference vector field may be a forward or backward order.

TABLE 20

| Number of antenna ports at eNode-B | Number of bits for TPMI information | Number of bits for downlink power offset | Interference vector |
| --- | --- | --- | --- |
| 2 | 2 | 1 | 1 |
| 4 | 4 | 1 | 1 |

(7) 7th Embodiment

In 4Tx transmission, the localized/distributed VRB assignment flag field and the PMI confirmation field can be used as the 2-bit interference vector field. Therefore, the DCI using the DCI format 1B in the MU-MIMO can be configured as shown in Table 21.

TABLE 21

| Information field | bit(s) |
| --- | --- |
| Localized/Distributed VRB assignment flag | 0 |
| Resource block assignment | $\lceil \log_2(N_{RB}^{DL}(N_{RB}^{DL} + 1)/2) \rceil$ |
| Modulation and coding scheme | 5 |
| HARQ process number | 3(FDD), 4(TDD) |
| New data indicator | 1 |
| Redundancy version | 2 |
| TPC command for PUCCH | 2 |
| Downlink Assignment Index | 2 |
| TPMI information for precoding | 2 or 4 |
| PMI confirmation for precoding | 0 |
| Interference vector | 2 |

Table 22 shows another example of the number of bits of the TPMI information field and the number of bits of the interference vector field with respect to the number of antenna ports.

TABLE 22

| Number of antenna ports at eNode-B | Number of bits for TPMI information | Interference vector |
| --- | --- | --- |
| 2 | 2 | 2 |
| 4 | 4 | 2 |

In 2Tx transmission, the localized/distributed VRB assignment flag field and the PMI confirmation field can be used as the 2-bit interference vector field.

(8) 8th Embodiment

In 2Tx transmission, a 2-bit codebook consisting of a subset of a 4-bit codebook can be defined. In 2Tx transmission, the localized/distributed VRB assignment flag field and the PMI confirmation field can be used as the 2-bit interference vector field. The DCI using the DCI format 1B in the MU-MIMO can be configured as shown in Table 21. The number of bits of the TPMI information field and the number of bits of the interference vector field with respect to the number of antenna ports can be described as shown in Table 22.

(9) 9th Embodiment

In 2Tx transmission, the localized/distributed VRB assignment flag field and the PMI confirmation field can be used as the 2-bit downlink power offset field. The DCI using the DCI format 1B in the MU-MIMO can be configured as shown in Table 13. The number of bits of the TPMI information field and the number of bits of the downlink power offset field with respect to the number of antenna ports can be described as shown in Table 14.

(10) 10th Embodiment

In 2Tx transmission, the localized/distributed VRB assignment flag field and the PMI confirmation field can be used as the 1-bit interference vector field and the 1-bit downlink power offset field. The DCI using the DCI format 1B in the MU-MIMO can be configured as shown in Table 19. The number of bits of the TPMI information field, the number of bits of the downlink power offset field, and the number of bits of the interference vector field with respect to the number of antenna ports can be described as shown in Table 20. An order of using fields from the localized/distributed VRB assignment flag field and the PMI confirmation field to the downlink power offset field and the interference vector field may be a forward or backward order.

The UE receives downlink data through the PDSCH according to the received DCI (step S220). The UE can obtain power information or interference information from the downlink power offset field or the interference vector field included in the DCI, and thus can more effectively receive the downlink data in the MU-MIMO.

Power information or interference information can be obtained from an interference vector field or a downlink power offset field included in downlink control information (DCI), and downlink data can be more effectively transmitted using multi user (MU)-multiple input multiple output (MIMO).

Every function as described above may be performed by processors such as a microprocessor, a controller, a microcontroller, an ASIC (Application Specific Integrated Circuit), and the like, based on software coded to perform such functions or program codes. Designing, developing, and implementing the codes may be obvious to the person in the art based on the description of the present invention.

The preferred embodiments of the present invention have been described with reference to the accompanying drawings, and it will be apparent to those skilled in the art that various modifications and variations can be made in the present invention without departing from the scope of the invention. Thus, it is intended that any future modifications of the embodiments of the present invention will come within the scope of the appended claims and their equivalents.

What is claimed is:

1. A method of receiving control information in a wireless communication system, the method performed by a user equipment (UE) and comprising:
   receiving a physical downlink control channel (PDCCH); and
   obtaining a downlink control information (DCI) format from the PDCCH, the DCI format comprising a plurality of information fields,
   wherein the DCI format is used for scheduling a single codeword in a multi user multiple input multiple output (MU-MIMO) scheme,
   wherein the plurality of information fields comprise a transmitted precoding matrix indicator (TPMI) information field indicating a codebook index, a downlink power offset for downlink data transmission, and a virtual resource block (VRB) assignment flag field identifying whether a resource block is assigned in a consecutive manner or a distributed manner,
   wherein the downlink power offset is a single information bit that is set to a first offset value indicating '0 (dB)' or a second offset value indicating '$-10 \log_{10} 2$ (dB)', and
   wherein the downlink power offset replaces a precoding matrix indicator (PMI) confirmation field indicating whether precoding is performed on downlink data by using a PMI reported by the UE.

2. The method of claim 1, wherein the TPMI information field further indicates a codebook of a subset consisting of a part of a codebook used in the downlink data transmission.

3. The method of claim 1, wherein the TPMI information field is immediately followed by the downlink power offset.

4. A user equipment (UE) for receiving control information in a wireless communication system, the UE comprising:
   a radio frequency unit configured to receive a physical downlink control channel (PDCCH); and
   a processor configured to obtain a downlink control information (DCI) format from the PDCCH, the DCI format comprising a plurality of information fields,
   wherein the DCI format is used for scheduling a single codeword in a multi user multiple input multiple output (MU-MIMO) scheme,
   wherein the plurality of information fields comprise a transmitted precoding matrix indicator (TPMI) information field indicating a codebook index, a downlink power offset for downlink data transmission, and a virtual resource block (VRB) assignment flag field identifying whether a resource block is assigned in a consecutive manner or a distributed manner,
   wherein the downlink power offset is a single information bit that is set to a first offset value indicating '0 (dB)' or a second offset value indicating '$-10 \log_{10} 2$ (dB)', and
   wherein the downlink power offset replaces a precoding matrix indicator (PMI) confirmation field indicating whether precoding is performed on downlink data by using a PMI reported by the UE.

5. The user equipment of claim 4, wherein the TPMI information field further indicates a codebook of a subset consisting of a part of a codebook used in the downlink data transmission.

6. The user equipment of claim 4, wherein the TPMI information field is immediately followed by the downlink power offset.

* * * * *